(12) United States Patent
Gustafsson

(10) Patent No.: US 6,905,611 B2
(45) Date of Patent: Jun. 14, 2005

(54) DEVICE FOR SEPARATING A SURFACE LAYER OF A LIQUID

(75) Inventor: Bengt Gustafsson, Rönninge (SE)

(73) Assignee: Alfa Laval Corporate AB, Lund (SE)

( * ) Notice: Subject to any disclaimer, the term of this patent is extended or adjusted under 35 U.S.C. 154(b) by 101 days.

(21) Appl. No.: 10/239,370
(22) PCT Filed: Mar. 9, 2001
(86) PCT No.: PCT/SE01/00505
§ 371 (c)(1),
(2), (4) Date: Feb. 6, 2003
(87) PCT Pub. No.: WO01/70633
PCT Pub. Date: Sep. 27, 2001

(65) Prior Publication Data
US 2003/0164325 A1 Sep. 4, 2003

(30) Foreign Application Priority Data
Mar. 21, 2000 (SE) ............................... 0000964

(51) Int. Cl.⁷ .................................................. C02F 1/40
(52) U.S. Cl. .................... 210/776; 210/122; 210/242.3; 210/540
(58) Field of Search ............................. 210/122, 242.1, 210/242.3, 540, 776

(56) References Cited

U.S. PATENT DOCUMENTS

| | | | | |
|---|---|---|---|---|
| 3,303,932 A | * | 2/1967 | Hirs et al. ................... 210/776 |
| 3,395,803 A | * | 8/1968 | Sumimoto et al. ........ 210/242.1 |
| 3,633,749 A | | 1/1972 | Panosh |
| 3,782,553 A | * | 1/1974 | Brekke ..................... 210/242.3 |
| 4,032,444 A | | 6/1977 | Wright et al. |
| 5,059,312 A | * | 10/1991 | Galletti ........................ 210/540 |
| 5,693,218 A | | 12/1997 | Yamamoto et al. |
| 6,159,362 A | * | 12/2000 | Gilmore ...................... 210/122 |
| 6,224,753 B1 | * | 5/2001 | Marbach .................. 210/242.1 |

FOREIGN PATENT DOCUMENTS

WO    WO 97/30821    8/1997

* cited by examiner

Primary Examiner—Christopher Upton
(74) Attorney, Agent, or Firm—Michaud-Duffy Group LLP

(57) ABSTRACT

The invention refers to a device for separating a surface layer of a liquid by a container submerged in the liquid. The container includes a bottom, a wall member, connected to the bottom and having a variable length, and a separating member, which is connected to the wall member and communicates with a space in the container via an opening. An overflow portion of the separating member is located below a free liquid surface of the surface layer and permits the flowing of liquid. A discharge conduit extends from the space for liquid discharge. A floating member, connected to the separating member, floats on the liquid outside the container and exerts a lifting force upon the separating member in a direction prolonging the wall member. A submerging member is connected to the separating member and located below the over flow portion. The submerging member has a mass and exerts a downwardly directed force, so that the overflow portion is located below the free liquid surface, and a lifting force due to liquid pressure when the space has been filled with such a quantity of liquid that the submerging member partly is located in the liquid, wherein the overflow portion will be above the free liquid surface.

16 Claims, 3 Drawing Sheets

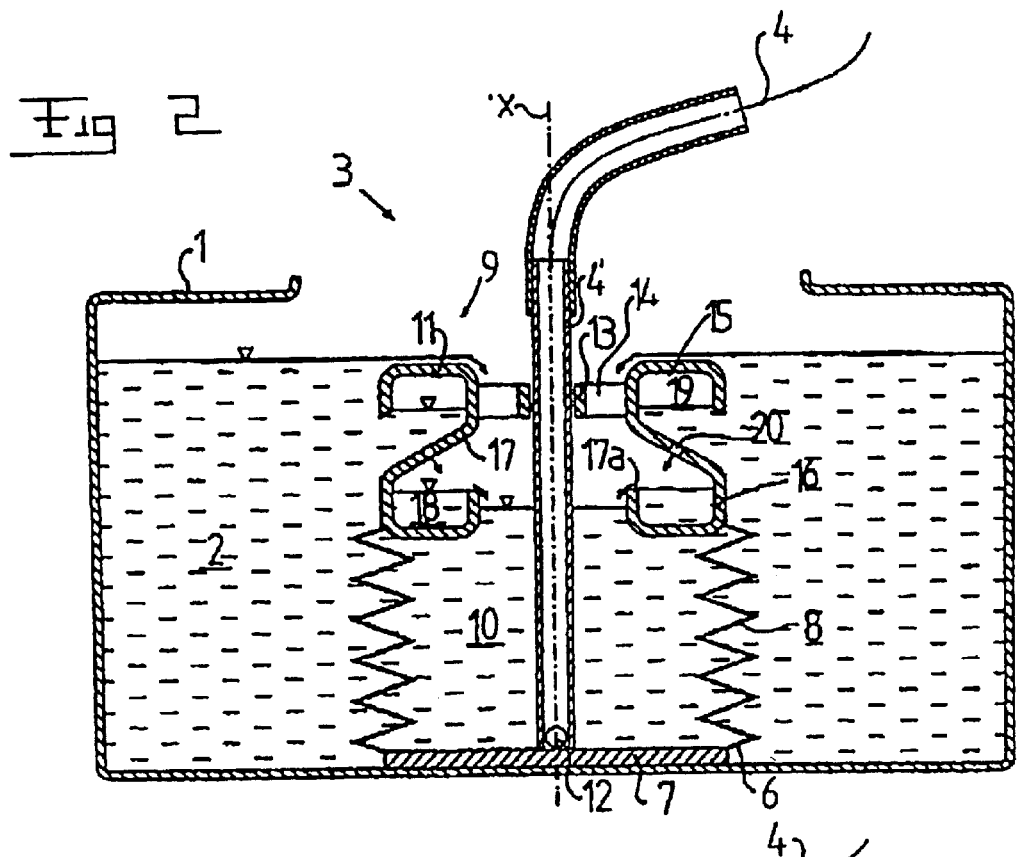
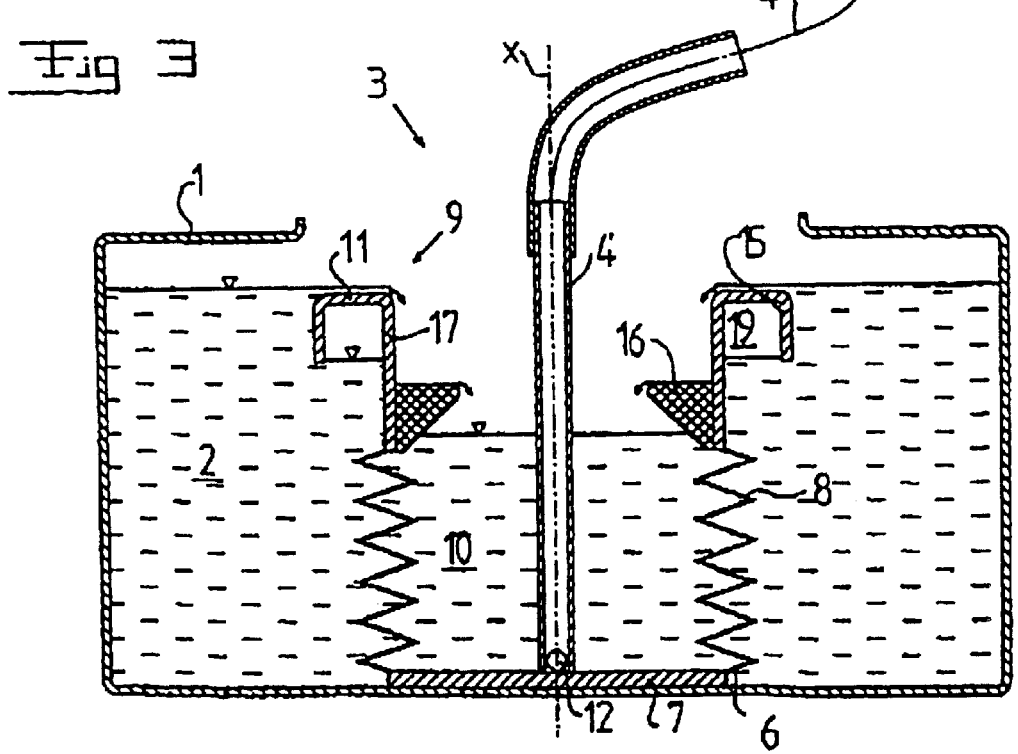

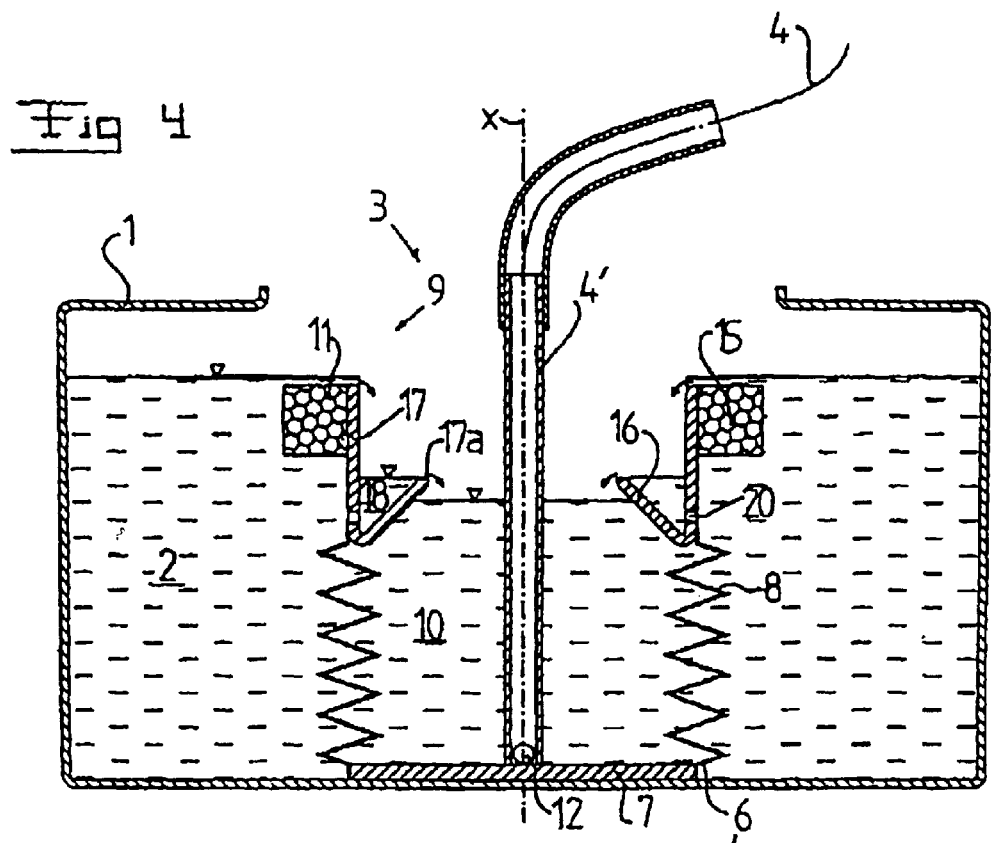
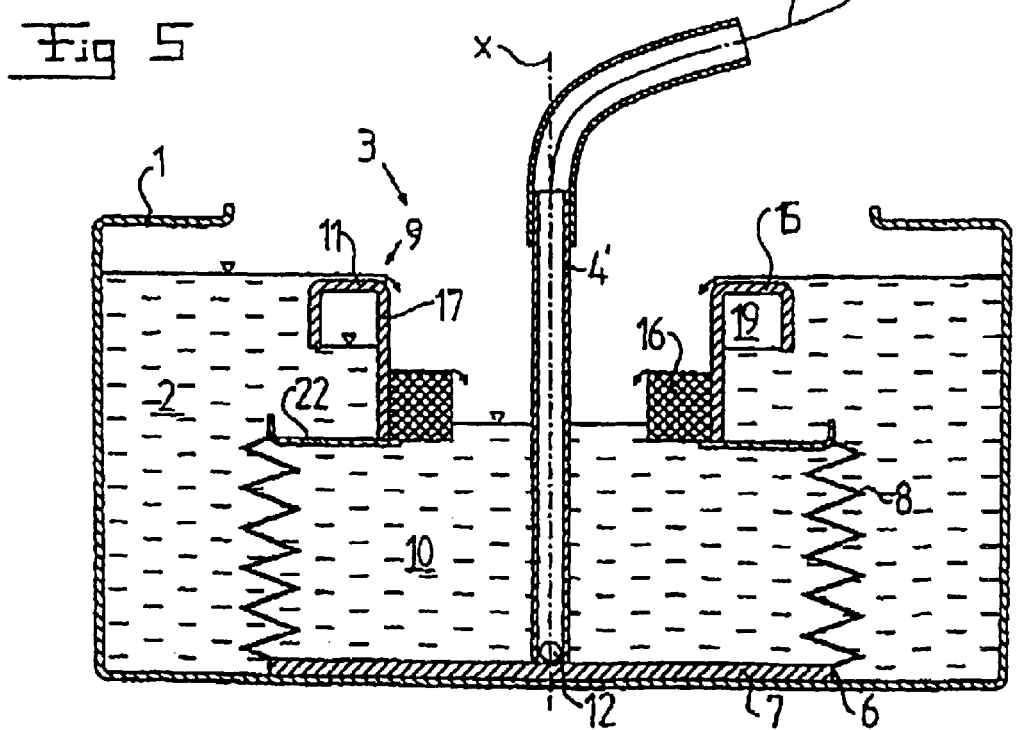

DEVICE FOR SEPARATING A SURFACE LAYER OF A LIQUID

CROSS-REFERENCE TO RELATED APPLICATIONS

This application is entitled to the benefit of and incorporates by reference essential subject matter disclosed in International Application No. PCT/SE01/00505 filed on Mar. 9, 2001 and Swedish Patent Application No. 0000964-7 filed on Mar. 21, 2000.

THE BACKGROUND OF THE INVENTION AND PRIOR ART

The present invention refers to a device for separating a surface layer of a liquid, including a container, which is intended to be submerged in the liquid and which includes: a bottom; a wall member, which has a centre axis extending substantially vertically when the container is submerged in the liquid, which wall member is connected to the bottom at a lower end of the wall member and has a variable length along the centre axis; and a separating member connected to an upper end of the wall member, which separating member has an opening, communicating with a space formed in the container, and an overflow portion, arranged, during separation of liquid from the surface layer having a free liquid surface, to be located at least partly below and adjacent to this liquid surface and to permit the flowing of liquid from the surface layer over the overflow portion through the opening into the space, in which a volume of separated liquid is collected, wherein the device also includes a discharge conduit, which extends from a part of the space, said part being filled with liquid during separation, and is arranged to discharge liquid from the space, and a floating member, which is connected with the separating member and which is arranged to float on the liquid located outside the container and to exert a lifting force upon the separating member in a direction prolonging the wall member.

There is at many different occasions a need of separating relatively lighter liquids from relatively heavier liquids.

It may for instance refer to different liquids, such as water, wash liquid or cutting fluid, which are used within industry and which are to be purified from relatively lighter impurities such as oil. In these cases, the liquid to be purified is most frequently located in a collecting tank or the like. The relatively lighter oil impurity will thereby to a large extent float on the surface of the relatively heavier liquid. If such oil impurities are permitted to be collected in the collecting tank, this may lead to health problems due to the aggressiveness of the included liquids, aggregation and growth of bacteria, and due to formation of mould. In addition, cutting fluids, which are not purified, are a problem both from an environmental and economical point of view, since they thus can not be reused. Other connections, where there is a need of this kind, may be cleaning of the sea or a lake from discharge of oil and from similar impurities floating on the surface, and purifying of water which has been contaminated by transformer oil.

U.S. Pat. No. 3,633,749 discloses such an initially defined device for separating of a surface layer. The wall member of the known device comprises a lower, outer cylinder and an upper, inner cylinder, which is partly displaceable in the lower cylinder. The two cylinders are connected to each other by a closed, flexible membrane, which permits said displacement. According to U.S. Pat. No. 3,633,749 the pressure difference on the membrane from the outside and the inside is utilised for providing a lifting force to the inner cylinder.

WO97/30821 discloses another device for separating a surface layer, which includes a floating body arranged in the space in the container and floating on the liquid in the container. When the liquid level in the container rises, the floating body will expand the bellow shaped wall of the container and close off the flow of liquid into the container. U.S. Pat. No. 5,693,218 discloses a similar device for separating a surface layer by means of a floating body floating on the liquid in the container.

Separating devices of these types are frequently used in different connections, which have different requirements thereto. Frequently, it is required that the separating device could be submerged in a tank or a tray for the liquid to be purified from relatively lighter impurities through an existing hole with a small diameter. The depth of the tank and the position of the free liquid surface within the tank may thereby vary within wide limits. This leads to a wish that such a separating device is to be have a small outer diameter and be provided with a wall element, the length of which along the centre axis is to be varied so much that the smallest length of the wall element frequently only should be a fraction of its maximum length.

Irrespective of if the floating member is arranged to mainly float on the liquid outside or the liquid within the container, the floating member has to be dimensioned in such a way that it is capable of lifting the separating member and prolonging the wall member by such a large force that it at maximum length of the wall element, when the downwardly directed, submerging force from the wall element upon the separating member is at the largest, is sufficient for lifting the separating member at need in such a way that its overflow portion is positioned above the free liquid surface and thus interrupts the flowing of liquid from the surface layer into the space in the container. At the same time, the separating device must be designed in such a way that the separating member is not lifted so much that the overflow portion is positioned above the free liquid surface when the liquid level in the space is below a certain level.

SUMMARY OF THE INVENTION

The object of the present invention is to provide a device, which enables a stable and reliable separation and collection of a surface layer of a liquid, and which may be used in a plurality of connections. Furthermore, it is aimed at a separation, which in an automatic manner, adapts to the flow by which the liquid, collected in the space, is discharged, for instance through pumping.

This object is obtained by the device initially defined, which is characterised in that the device also comprises a submerging member provided in the space, which submerging member is connected to the separating member and located at a certain vertical distance from and below the overflow portion, wherein the submerging member has a certain mass and is arranged to exert a downwardly directed force upon the separating member, which is of such an order that it is able to press the separating member so far down into the liquid surrounding the container against the action of the lifting force from the floating member that the overflow portion becomes located below the free liquid surface, and wherein the submerging member also is arranged in such way that the submerging member and the separating member are influenced by a force in a lifting direction by the liquid pressure acting upon the submerging member from the liquid, which is located above the lowest point of the submerging member when the space has been filled with such a quantity of liquid that a part of the submerging member is located in this liquid. In such a way, the overflow portion will be located above the free liquid surface when this part of the submerging member is located in the liquid within the space.

By designing the device with a submerging member in this way, the device is given a downwardly directed-submerging-force, which acts powerfully upon the separating member and which in a very distinct manner decreases as soon as the space within the container has been filled with so much liquid that the submerging member partly is located in this liquid. Hereby, the device separates and collects in a very stable and reliable manner a surface layer of the liquid. Through the invention, a universal device is thus obtained, which may be used for different types of liquids and for liquids with a varying degree of contamination. Furthermore, the device may be utilised in different types of tanks for the liquid, the surface layer of which is to be separated. Thanks to the submerging member, the device may be adapted in an automatic manner to very different liquid levels in such tanks.

According to an embodiment of the invention, the discharge conduit is connected to the bottom and has an inlet for said discharge of liquid in the proximity of the bottom. The container may be intended to be provided in a tank in which the liquid is present, wherein the bottom and/or the discharge conduit is connected to the tank at a certain depth therein. In such a way it is possible to let the bottom and/or the discharge conduit take a determined, stationary position in relation to the tank when using the device.

According to a further embodiment of the invention, the submerging member has a radial cross-section area, which increases along the centre axis from below. In such a way, the lifting force acting upon the submerging member from the liquid within the space in the container will increase faster and faster when the liquid levels successively rises above the lowest point of the submerging member.

According to a further embodiment of the invention, the submerging member has a substantially constant mass. Such a submerging member has a reliable function. The mass is of such an order that the submerging member exerts such a large downwardly directed force upon the separating member that the overflow portion comes below the free liquid surface when the container is empty.

According to another embodiment of the invention, the submerging member comprises a first pocket, which is open upwardly and arranged to receive a part of said liquid. In order to enable a quick filling of the pocket, the container may comprise a passage, which permits inflow of said part of the liquid to the first pocket.

According to a further embodiment of the invention, the separating member is shaped by an element and extends around the centre axis. In such a way, the device may be manufactured in an easy manner. Said element may thereby be bent for forming the first pocket, wherein said passage may include at least one whole through said element.

According to a further embodiment of the invention, the floating member includes a floating body with a substantially constant mass. The floating member may also include a second pocket, which is open downwardly and arranged to form a closed space for a gas when the container is submerged in the liquid. Thereby, said element may be bent for forming the second pocket.

According to a further embodiment o the invention, the submerging member is provided at least partly axially below the floating member with respect to the centre axis. Furthermore, the submerging member may be provided at least partially inside the floating member with respect to the centre axis.

According to a further embodiment of the invention, the container includes a flange-like member, which extends outwardly with respect to the centre axis, wherein an inner part of the flange-like member is connected to a lower part of the submerging member, the wall member is connected to an outer part of the flange-like member. The floating member may be located substantially straight above the flange-like member.

The liquid which is located in the space and above the flange-like member will hereby also act upon the same and thereby also upon the separating member with a lifting force. The submerging force of the submerging member is thereby decreasing in a more distinct manner as soon as the space within the container has been filled with so much liquid that this member is located below the liquid level in the space.

The object is also obtained by the method defined in the independent claim 16.

BRIEF DESCRIPTION OF THE DRAWINGS

The present invention is now to be explained more closely by means of embodiments described by way of example and with reference to the drawings attached hereto.

FIG. 2 discloses a cross-sectional view of a device according to a second embodiment of the invention.

FIG. 3 discloses a cross-sectional view of a device according to a third embodiment of the invention.

FIG. 4 discloses a cross-sectional view of a device according to a fourth embodiment of the invention.

FIG. 5 discloses a cross-sectional view of a device according to a fifth embodiment of the invention.

DETAILED DESCRIPTION OF DIFFERENT EMBODIMENTS OF THE INVENTION

Figure 1:
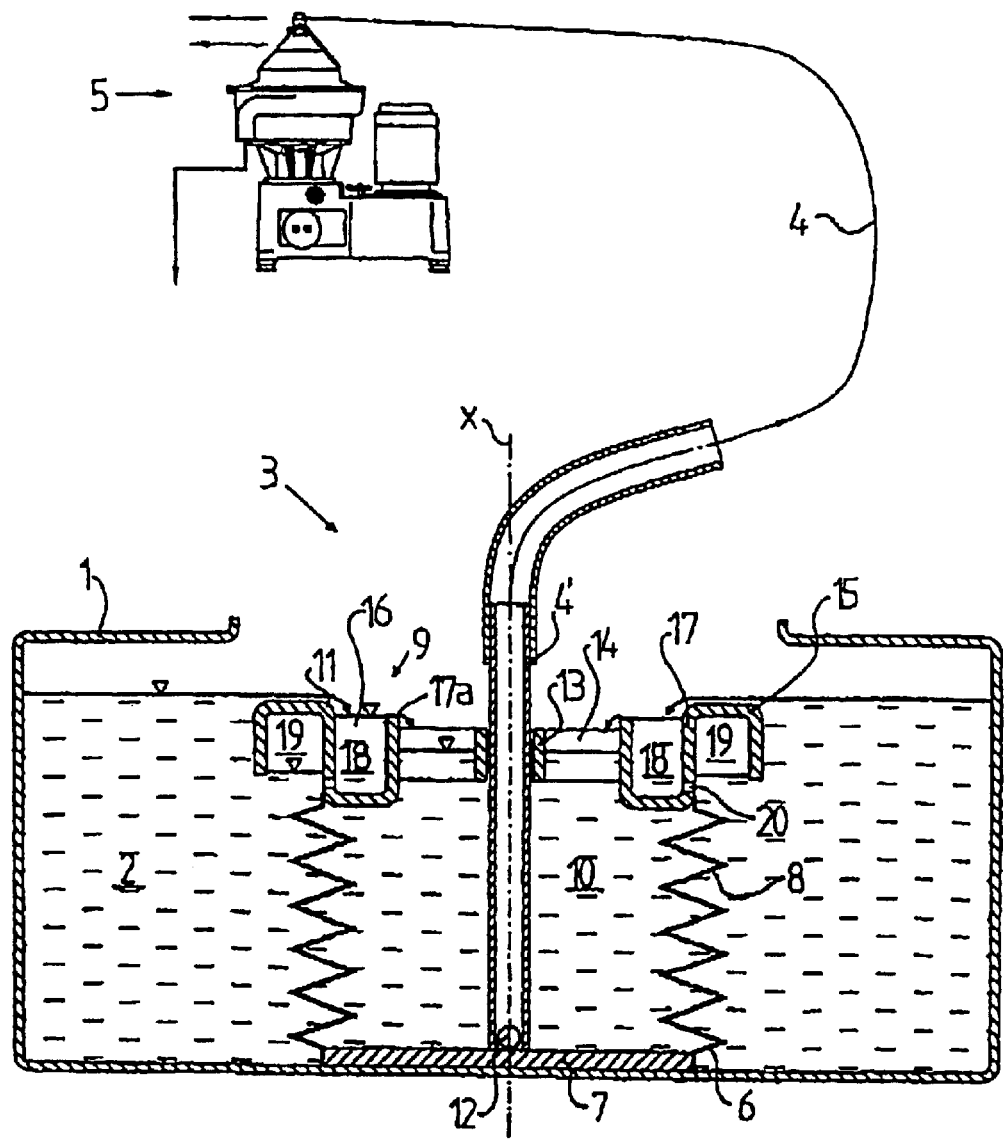
FIG. 1 discloses a cross-sectional view of a device for separating a surface layer of a liquid according to a first embodiment of the invention.

FIG. 1 discloses a tank 1, which forms a tank space 2 arranged to receive and store a liquid. The tank 1 may for instance be arranged to receive cutting fluid from any working machine, such as a lathe, a milling machine or any multi-operating machine. The used cutting fluid includes unwanted substances, for instance oils, which have a lower density than the cutting fluid and therefore are collected in a surface layer of the liquid in the tank space 2. Therefore it is desirable to separate this surface layer for enabling reuse of the cutting fluid. FIG. 1 discloses such a device 3 for separating a surface layer of the liquid of the tank space 2. The separated surface layer is conveyed via a discharge conduit 4 to a centrifugal separator 5 in which the surface layer may be treated further for separation of different components of the same.

The separating device 3 includes a container 6, which is submerged in the liquid in the tank 1. The container 6 includes a bottom in the form of a bottom plate 7, which in the example disclosed abuts or is connected to a bottom of the tank 1. Furthermore, the container 6 includes a wall member 8, which has a centre axis x extending substantially vertically when the container 6 is submerged in the liquid. The wall member 8, which forms a cylinder, is connected to the bottom plate 7 at a lower end of the wall member 8 around the whole periphery of the wall member 8. Furthermore, the wall member 8 has a variable length in the direction of the centre axis x and is in the example disclosed designed as a bellow. It is to be noted, that the wall member 8 also may be designed in other ways, for instance as a telescopic wall member. Furthermore, the container 6 includes an annular separating member 9, which is connected to an upper end of the wall member 8 around the whole periphery of the cylindrical wall member 8. Consequently, the container 6 forms an inner space 10 and the cylindrical separating member 9 forms an opening, which also is an opening for the inner space 10 of the container 6. The separating member 9 has an overflow portion 11, over which liquid from the surface layer, which has a free liquid surface, may flow from the surface layer through the opening and into the inner space 10. In such a way, a volume of separated liquid from the surface layer will be collected in the inner space 10.

Furthermore, the separating device 3 includes the discharge conduit 4 mentioned above, via which the separated liquid may be pumped out of the inner space 10 by means of a pump member, not disclosed, to the centrifugal separator 5. The discharge conduit 4 has an inlet 12, which is located in the proximity of the bottom plate 7. In the example disclosed, the discharge conduit 4 is fixedly connected to the bottom plate 7. The separating member 9 may hence be displaced upwardly and downwardly in relation to the bottom plate 7 thanks to the variable length of the wall member 8. Consequently, the separating member 9 will be displaced in relation to the discharge conduit 4 and includes a guiding ring 13, which is slideably provided on a part 4' of the discharge conduit 4 introduced into the container 6 and which is connected to the separating member 9 proper via spokes 14. The bottom plate 7 as well as the discharge conduit 4 are thus stationary in relation to the tank 1. However, one may always consider that the discharge conduit 4 is stationary in relation to the tank 1, wherein not only the separating member 9 but also the bottom plate 7 may be movable in a vertical direction in relation to the discharge conduit 4.

The separating device 3 also includes a floating member 15 and a submerging member 16. The floating member 15 is arranged to float on the liquid present outside the container 6 and to exert a lifting force upon the separating member 9, i.e. the floating member 15 strives to prolong the wall member 8. The submerging member 16 has a certain mass and is arranged to exert a downwardly directed force upon the separating member 9. This downwardly directed force is of such an order that it is capable of pressing the separating member 9 down into the liquid which surrounds the container 6 against the action of the lifting force from the floating member 15. More specifically, the mass of the submerging member 16 is to be of such an order that the submerging member 16 is capable of pressing the separating member 9 so far down that the overflow portion 11 is located below the free liquid surface. Thereby, liquid from the surface layer will flow into the inner space 10 in the container 6 in such a manner that this space 10 is filled with separated liquid. When the liquid level in the inner space 10 reaches the submerging member 16, this will exert a force upon the separating member 9 in a lifting direction due to the liquid pressure from the liquid in the inner space 10, which acts upon the submerging member 16. The submerging member 16 is dimensioned in such a way that this lifting force is of such an order that the overflow portion 11 will be located above the free liquid surface before the whole submerging member 16 is below the liquid level. Consequently, the submerging member 16 will contribute to displacing the overflow portion 11 downwardly below the free liquid surface when the container 7 is empty or merely contains a small volume of separated liquid, and to displace the overflow portion 11 upwardly above the free liquid surface when the container 7 is substantially filled with separated liquid as a consequence of the fact that the submerging member 16 is located at a vertical level close to the vertical level of the floating member 15.

In the embodiment disclosed in FIG. 1, the separating member 9, the floating member 15 and the submerging member 16 are designed from a bent or shaped relatively thin element 17 of metal, plastics, rubber or any other suitable material by for instance mould pressing or mould extrusion. The element 17 is designed in such a way that it forms a first pocket 18, which is open upwardly, and a second pocket 19, which is open downwardly. The first pocket 18 forms the submerging member 16 and the second pocket 19 forms the floating member 15. The first pocket 18, i.e. the submerging member 16, is in the first embodiment located radially inside the second pocket 19, i.e. the floating member 15. Furthermore, in the first embodiment the first pocket 18, i.e. the submerging member 16, is located somewhat below the second pocket 19, i.e. the floating member 15. When the container 6 is submerged in water, the second pocket 19, which is open downwardly, will thus enclose a gas cushion, which will function as a floating body of the floating member 15. In order to give the submerging member 16 a sufficient mass one or several passages in the form of holes 20 are provided in such a way that they extend through the element 17 in such a way that the liquid, which surrounds the container 6, may flow through the holes 20 into the first pocket 18 and contribute to the filling thereof with liquid. Thereby, the mass of the submerging member 16 will increase and the submerging member 16 may exert the downwardly directed force mentioned above upon the separating member 9. In the embodiments disclosed in FIG. 1 liquid from the surface layer will flow over the overflow portion 11 and into the first pocket 18. When the first pocket 18 is filled, the liquid in the first pocket 18 will flow over an end edge 17a of the element 17 and down into the inner space 10. The end edge 17a is located vertically below the overflow portion 11.

The second embodiment, which is disclosed in FIG. 2, differs from the first embodiment by the first pocket 18, i.e. the submerging member 16, being provided substantially straight below the first pocket 19, i.e. the floating member 15. It is to be noted, that elements, which have substantially the same function, have been provided with the same reference signs in all the embodiments disclosed. In the embodiments disclosed in FIGS. 2–5, the centrifugal separator 5 or any alternative purifying equipment has been dispensed with in the figures.

The third embodiment, which is disclosed in FIG. 3, includes a submerging member 16, which has a constant mass. In this case, the submerging member 16 may be manufactured of a solid material of for instance metal or plastics.

In the fourth embodiment, disclosed in FIG. 4, the floating member 15 has instead been designed as a solid floating body, which may manufactured of any light material, for instance cellular plastics.

In the third and fourth embodiments, the submerging member 16 has in addition been provided with an increasing radial cross-sectional area along the centre axis x from below. Thereby, the lifting force from the liquid within the space in the container, which acts upon the submerging member 16, will increase faster and faster when the liquid level successively rises above the lowest point of the submerging member 16.

In the fifth embodiment disclosed in FIG. 5, a flange-like annular member 2 is connected to the element 17 at a lower part thereof. The flange-like member 22 extends substantially radially outwardly with regard to the centre axis x, wherein the element 17 is connected to an inner part of the flange-like member 22, and the wall member 8 is connected to a radially outer part of the flange-like member 22. The floating member 15 is located substantially straight above the flange-like member 22.

In the third, fourth and fifth embodiments, the guide ring 13 and the spokes 14 have been dispensed with in order to illustrate that these components are not necessary for the function of the separating device 3.

The overflow portion 11 may be designed as a rounded edge, see FIGS. 1–3 and 5, or a relatively sharp edge, see FIG. 4. The overflow portion 11 may also include slots (not disclosed), which extend substantially radially inwardly towards the opening to the inner space 10 and which thus form channels for the liquid from the surface layer.

This means that a stable regulation of the inflow into the space 10 may be obtained and that the liquid level within the space may be kept at a substantially constant level.

The prolongable, bellow-shaped wall element 8 may be glued or vulcanised to the bottom plate 7 and to the submerging member 16. Alternatively, the wall element 8 may be forced onto the outside of the bottom plate 7 and the submerging member 16, respectively, possibly over an edge or a flange.

The invention is not limited to the embodiments disclosed but may be varied and modified within the scope of the following claims.

For instance, the invention, is not limited to separating a surface layer of used cutting fluids, but may be utilised for separation of surface layers of any liquids. The liquid in which the container 6 is to be submerged does not need to be enclosed in a tank, but the invention may for instance be utilised for separation of a surface layer, including waste oil, on a sea or a lake.

The device may also be adapted to different conditions, for instance with regard to the density of the liquid, since the design of the submerging member 16 permits receiving of differently large replaceable weights in the first pocket 16. Such weights may for instance be shaped as rings.

What is claimed is:

1. A device for separating a surface layer of a liquid, including a container, which is intended to be submerged in the liquid and which includes:
   a bottom;
   a wall member, which has a centre axis (x) extending substantially vertically when the container is submerged in the liquid, which wall member is connected to the bottom at a lower end of the wall member and has a variable length along the centre axis (x); and
   a separating member connected to an upper end of the wall member, which separating member has an opening, communicating with a space formed in the container, and an overflow portion, arranged, during separation of liquid from the surface layer having a free liquid surface, to be located at least below and adjacent to this liquid surface and to permit the flowing of liquid from the surface layer over the overflow portion through the opening into the space, in which a volume of separated liquid is collected,
   the device also includes a discharge conduit, which extends from a part of the space, said part being filled with liquid during separation, and is arranged to discharge liquid from the space, and a floating member, which is connected to the separating member and which is arranged to float on the liquid located outside the container and to exert a lifting force upon the separating member in a direction prolonging the wall member,
   a submerging member provided in the space, which submerging member is attached directly to, and positioned proximate to the separating member and located at a certain vertical distance from and below the overflow portion,
   the submerging member has a certain mass and is arranged to exert a downwardly direded force upon the separating member, which is of such an order that it is able to press the separating member so far down into the liquid surrounding the container against the action of the lifting force from the floating member that the overflow portion becomes located below the free liquid surface, and wherein the submerging member also is arranged in such way that the submerging member and the separating member are influenced by a force in a lifting direction by the liquid pressure acting upon the submerging member from the liquid, which is located above the lowest point of the submerging member when the space has been filled with such a quantity of liquid that a part of the submerging member is located in this liquid.

2. A device according to claim 1, wherein the discharge conduit is connected to the bottom and has an inlet for said discharge of liquid in the proximity of the bottom.

3. A device according to claim 1, wherein the container is configured to be provided in a tank in which the liquid is present, wherein at least one of the bottom and the discharge conduit is configured to be connected to the tank at a certain depth therein.

4. A device according to claim 1, wherein the submerging member has a radial cross-section area, which increases along the centre axis (x) from below.

5. A device according to claim 1, wherein the submerging member has a substantially constant mass.

6. A device according to claim 1, wherein the submerging member includes a first pocket, which is open upwardly and arranged to receive a part of said liquid.

7. A device according to claim 6, wherein the container includes a passage, which permits in-flow of said part of the liquid to the first pocket.

8. A device according to claim 7, wherein said passage includes at least one hole through said element.

9. A device according to claim 6, wherein the floating member includes a second pocket, which is open downwardly and arranged to form a dosed space for a gas when the container is submerged in the liquid.

10. A device according to claim 9, wherein the separating member is shaped by an element and extends around the centre axis (x) and wherein said element is bent for forming the second pocket.

11. A device according to claim 1, wherein the separating member is shaped by an element and extends around the centre axis (x).

12. A device according to claim 1, wherein the floating member includes a floating body with a substantially constant mass.

13. A device according to claim 1, wherein the submerging member is provided at least partly axially below the floating member with respect to the centre axis (x).

14. A device according to claim 1, wherein the submerging member is provided at least partly radially inside the floating member with respect to the centre axis (x).

15. A device according to claim 1, wherein the container includes a flange-like member, which extends outwardly with respect to the centre axis (x), wherein an inner part of the flange-like member is connected to a lower part of the submerging member, and the wall member is connected to an outer part of the flange-like member.

16. A method for separating a surface layer of a liquid by means of a container, which forms a space, wherein the container includes a bottom, a wall member, which has a variable length along a centre axis (x) and is connected to the bottom at a lower end of the wall member, and a separating member connected to an upper end of the wall member, which separating member has an opening and an overflow portion, wherein the device includes a floating member connected to the separating member and a submerging member attached directly to, and positioned proximate to the separating member, which submerging member is provided in the space and located at a certain distance from the overflow portion along the centre axis (x), and wherein the method includes the steps of:

submerging the container in the liquid in such a way that the centre axis (x) extends substantially vertically;

keeping the container floating in the liquid by means of the floating member, which floats on the liquid located outside the container and exerts a lifting force upon the separating member in a direction prolonging the wall member, pressing the container down in the liquid by means of the submerging member, which, upon the separating member, exerts a downwardly directed force, which is of such an order that it is able to press the separating member so far down into the liquid surrounding the container against the action of the lifting force from the floating member that the overflow portion is located below a free liquid surface of the surface layer, bringing liquid from the surface layer to flow over the overflow portion through the opening into the space in such a way that a volume of separated liquid is collected in the space, and keeping the container at a desired level in the liquid by discharging the liquid collected in the space from the space via a discharge conduit, and by influencing the submerging member and the separating member by a force in a lifting direction by the liquid pressure acting upon the submerging member from the liquid, which is located in the space above the lowest point of the submerging member, wherein the separating member is lifted to such an extent that the overflow portion becomes located above the free liquid surface when the space has been filled with such a quantity of liquid that the submerging member partly is located in this liquid.

* * * * *

UNITED STATES PATENT AND TRADEMARK OFFICE
CERTIFICATE OF CORRECTION

PATENT NO. : 6,905,611 B2 Page 1 of 1
DATED : June 14, 2005
INVENTOR(S) : Bengt Gustafsson It is certified that error appears in the above-identified patent and that said Letters Patent is hereby corrected as shown below:

Column 8,
Line 12, after "exert a downwardly", please delete "direded" and substitute
-- directed --.
Line 50, after "arranged to form a", please delete "dosed" and substitute
-- closed --.

Signed and Sealed this

Twenty-third Day of August, 2005

JON W. DUDAS
*Director of the United States Patent and Trademark Office*